US012587655B2

(12) United States Patent
Sabah et al.

(10) Patent No.: US 12,587,655 B2
(45) Date of Patent: Mar. 24, 2026

(54) IMPROVING STREAMING VIDEO QUALITY IN LOSSY NETWORK CONDITIONS

(71) Applicant: NVIDIA Corporation, Santa Clara, CA (US)

(72) Inventors: Fateh Sabah, The Hague (NL); Mohamadreza Marandian Hagh, San Jose, CA (US); Varun Vijaya Kumar, San Jose, CA (US); Shridhar Majali, San Francisco, CA (US); Harsh Maniar, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 147 days.

(21) Appl. No.: 18/458,479

(22) Filed: Aug. 30, 2023

(65) Prior Publication Data

US 2025/0080755 A1 Mar. 6, 2025

(51) Int. Cl.
| | |
|---|---|
| *H04N 19/159* | (2014.01) |
| *H04N 19/154* | (2014.01) |
| *H04N 19/172* | (2014.01) |
| *H04N 19/65* | (2014.01) |
| *H04N 19/88* | (2014.01) |

(52) U.S. Cl.
CPC ......... *H04N 19/159* (2014.11); *H04N 19/154* (2014.11); *H04N 19/172* (2014.11); *H04N 19/65* (2014.11); *H04N 19/88* (2014.11)

(58) Field of Classification Search
CPC .... H04N 19/159; H04N 19/15; H04N 19/172; H04N 19/65; H04N 19/88
See application file for complete search history.

(56) References Cited

U.S. PATENT DOCUMENTS

| | | | |
|---|---|---|---|
| 7,984,179 B1 * | 7/2011 | Huang | H04N 21/6373 |
| | | | 709/233 |
| 8,184,636 B2 * | 5/2012 | Sunahara | H04N 21/2389 |
| | | | 370/473 |
| 8,339,406 B2 | 12/2012 | Prabhakar et al. | |
| 8,861,586 B2 | 10/2014 | Jia | |
| 10,616,086 B2 | 4/2020 | Tamasi et al. | |

(Continued)

FOREIGN PATENT DOCUMENTS

CN 116471240 * 2/2023

OTHER PUBLICATIONS

Ning, Lei translation of CN 116471240 Feb. 21, 2023 (Year: 2023).*

*Primary Examiner* — Zaihan Jiang
(74) *Attorney, Agent, or Firm* — Foley & Lardner LLP

(57) ABSTRACT

In various examples, systems, devices and methods are disclosed relating to enhancing the efficiency and reducing the delay of error resilience in multimedia communication systems. The systems, devices and methods can include a computer system determining a sliding frame window (or a sliding reference window) for a video stream. The size of the sliding frame window represents a minimum separation between reference frames and corresponding inter frames. The computer system can encode a plurality of video frames of the video stream according to the size of the sliding frame window, such that a separation between any pair of video frames of the plurality of video frames including a reference frame and a corresponding inter-frame is greater than or equal to the size of the sliding frame window.

17 Claims, 9 Drawing Sheets

300

[ ] chain 304a
[ ] chain 304b
[ ] chain 304c

302a 302b 302c

| P-frame 1 | P-frame 2 | P-frame 3 | P-frame 4 | P-frame 5 | P-frame 6 | P-frame 7 | P-frame 8 | P-frame 9 | ... |

302d 302e 302f 302g 302h 302i

Sliding Frame Window = 3 frames

(56)  References Cited

U.S. PATENT DOCUMENTS

| | | | |
|---|---|---|---|
| 11,265,599 B2 | 3/2022 | Lapicque et al. | |
| 2007/0160137 A1* | 7/2007 | Guo ..................... | H04N 19/166 |
| | | | 375/E7.176 |
| 2007/0242080 A1* | 10/2007 | Hamada ................. | H04N 19/44 |
| | | | 375/E7.254 |
| 2008/0144519 A1* | 6/2008 | Cooppan ............. | H04L 43/0817 |
| | | | 370/252 |
| 2008/0232478 A1* | 9/2008 | Teng ................... | H04N 19/159 |
| | | | 375/E7.165 |
| 2010/0135395 A1* | 6/2010 | Servais ............... | H04N 19/156 |
| | | | 375/E7.123 |
| 2013/0170451 A1* | 7/2013 | Krause ............... | H04W 72/542 |
| | | | 370/329 |
| 2014/0241426 A1* | 8/2014 | Fucci .................. | H04N 19/895 |
| | | | 375/E7.243 |
| 2019/0297326 A1 | 9/2019 | Reda et al. | |
| 2020/0162762 A1* | 5/2020 | Borsos ................ | H04N 21/835 |
| 2021/0250597 A1* | 8/2021 | Du ....................... | H04N 19/136 |
| 2022/0210469 A1* | 6/2022 | Zhou ................... | H04N 19/172 |

* cited by examiner

IMPROVING STREAMING VIDEO QUALITY IN LOSSY NETWORK CONDITIONS

BACKGROUND

Video segments are sequences of images or video frames that are displayed sequentially according to a frame rate or a rendering speed. Each image or video frame has a relatively large number of pixels, with each pixel being associated with one or more color values. Storing or transmitting video segments leads to significant consumption of memory or bandwidth resources. Video compression provides various techniques for reducing the data or number of bits used to encode digital video content. This reduction in data translates to a reduction in consumed storage resources and/or consumed transmission bandwidth when storing and/ or transmitting a video clip. One video compression technique is known as inter-frame prediction where the content of a video frame is predicted from another video frame. Because inter-frame compression techniques typically encode only changes between frames, the amount of pixels used to encode an inter-predicted frame is usually significantly smaller than the number of pixels used to encode an entire frame (also referred to as an intra frame or I-frame).

While providing significant reduction in data, inter-frame prediction comes with its own challenges. First, inter-frame prediction induces dependency between video frames of a video sequence. The dependency between the frames implies that the loss or corruption of one frame will affect other frames that depend on the lost or corrupted frame. Also, the inter-frame prediction imposes some storage capacity at the encoder and the decoder to store reference frames.

SUMMARY

Embodiments of the present disclosure relate to efficient error resilience in multimedia communication systems. Systems, devices and methods are disclosed that incorporate video compression techniques for enhancing the efficiency and reducing the delay of error resiliency when communicating video data over communication networks. The systems, devices and methods can enforce a dynamic and adaptive minimum distance or separation between inter frames and corresponding reference frames when encoding video data. The minimum distance or separation between inter frames and corresponding reference frames can be determined adaptively based on desired latency. This approach can lead to a compressed video stream having interleaved sub-streams or referencing chains, which can be independent of each other. This frame referencing scheme can spread errors and/or video stutter, e.g., due to lost frames or data packets thereof, temporally and provides more time for data recovery.

According to at least one aspect, a processor can include one or more circuits to determine a size of a sliding frame window for a video stream. The size of the sliding frame window represents a minimum distance or separation between reference frames and corresponding inter frames. The one or more circuits can encode a plurality of video frames of the video stream according to the size of the sliding frame window, such that a distance or separation between any pair of video frames of the plurality of video frames, including a reference frame and a corresponding inter frame, is greater than or equal to the size of the sliding frame window.

In some implementations, the size of the sliding frame window can be determined as a minimum number of consecutive video frames separating the reference frame and the corresponding inter frame, such that the minimum number of consecutive video frames is greater than one. In some implementations, the one or more circuits can determine distances or separations between reference frames and corresponding inter frames to be smaller than or equal to a size of a decoded picture buffer (DPB) of a decoder receiving the video stream.

In some implementations, in determining the size of the sliding frame window, the one or more circuits can receive a message indicative of a previously transmitted video frame that is determined or declared to be lost or to be associated with lost data packets, determine a count of video frames transmitted after transmission of the previously transmitted video frame and before reception of the message, and determine the size of the sliding frame window using the count of video frames. In some implementations, in determining the size of the sliding frame window, the one or more circuits can receive a plurality of messages, each message indicative of a corresponding previously transmitted video frame that is determined or declared to be lost or to be associated with lost data packets, determine, for each message of the plurality of messages, a corresponding count of video frames transmitted after transmission of the corresponding previously transmitted video frame and before reception of the message, and determine the size of the sliding frame window using counts of video frames corresponding to the plurality of messages.

In some implementations, the one or more circuits can determine the size of the sliding frame window as at least one of an exponential average of counts of video frames corresponding to the plurality of messages, an average of the counts of the video frames corresponding to the plurality of messages, or a weighted average of the counts of the video frames corresponding to the plurality of messages. In some implementations, the one or more circuits can determine the size of the sliding frame window to be equal to an estimate of a sum of (i) a round trip delay between the apparatus and a decoder receiving the video stream and (ii) a waiting time of the decoder representing a time duration during which the decoder waits before determining or declaring a video frame to be lost or to be associated with lost data packets.

In some implementations, in encoding the plurality of video frames of the video stream according to the size of the sliding frame window, the one or more circuits can encode the video stream as multiple interleaved sub-streams, each sub-stream representing a separate referencing chain of video frames. The multiple interleaved sub-streams can be independent of one another.

In some implementations, the plurality of video frames is a first plurality of video frames and the one or more circuits can update the size of the sliding frame window, and can encode a second plurality of video frames of the video stream according to the updated size of the sliding frame window such that a distance or separation between any pair of video frames of the second plurality of video frames including a reference frame and a corresponding inter-frame is greater than or equal to the updated size of the sliding frame window.

In some implementations, the one or more circuits can receive a message indicative of a first video frame that was previously transmitted and that is declared to be lost or to be associated with lost data packets, identify a set of video frames encoded as directly or indirectly dependent upon the first video frame, and invalidate the set of video frames encoded as directly or indirectly dependent upon the first video frame. In some implementations, the one or more circuits can receive a message indicative of a first video frame that was previously transmitted and that is determined or declared to be lost or to be associated with lost data packets, identify a set of video frames, if any, encoded as directly or indirectly dependent upon the first video frame, identify a second video frame to be encoded as dependent upon the first video frame or upon another video frame of the set of video frames, and (i) drop the second frame, (ii) encode the second frame as an intra frame, or (iii) encode the second frame as dependent upon another video frame different from the first video frame and different from the set of video frames.

In some implementations, the processors comprises a memory storing executable instructions. The executable instructions when executed by the one or more circuits cause the processor to determine the size of the sliding frame window and encode the plurality of video frames of the video stream according to the size of the sliding frame window.

According to another aspect, a method can include determining, by one or more processors, a size of a sliding frame window for a video stream. The size of the sliding frame window represents a minimum distance or separation between reference frames and corresponding inter frames. The method can include encoding, by the one or more processors, a plurality of video frames of the video stream according to the size of the sliding frame window, such that a distance or separation between any pair of video frames of the plurality of video frames including a reference frame and a corresponding inter-frame is greater than or equal to the size of the sliding frame window.

In some implementations, the size of the sliding frame window is determined as a minimum number of consecutive video frames separating the reference frame and the corresponding inter frame, such that the minimum number of consecutive video frames is greater than one. In some implementations, the method can include determining, by the one or more processors, distances or separations between reference frames and corresponding inter frames to be smaller than or equal to a size of a decoded picture buffer (DPB) of a decoder receiving the video stream.

In some implementations, determining the size of the sliding frame window includes receiving a message indicative of a previously transmitted video frame that is determined or declared to be lost or to be associated with lost data packets, determining a count of video frames transmitted after transmission of the previously transmitted video frame and before reception of the message, and determining the size of the sliding frame window using the count of video frames. In some implementations, determining the size of the sliding frame window includes receiving a plurality of messages, each message indicative of a corresponding previously transmitted video frame that is determined or declared to be lost or to be associated with lost data packets, determining, for each message of the plurality of messages, a corresponding count of video frames transmitted after transmission of the corresponding previously transmitted video frame and before reception of the message, and determining the size of the sliding frame window using counts of video frames corresponding to the plurality of messages.

In some implementations, the method can include determining the size of the sliding frame window as at least one of an exponential average of counts of video frames corresponding to the plurality of messages, an average of the counts of the video frames corresponding to the plurality of messages, or a weighted average of the counts of the video frames corresponding to the plurality of messages. In some implementations, the method can include determining the size of the sliding frame window to be equal to an estimate of a sum of (i) a round trip delay between the apparatus and a decoder receiving the video stream and (ii) a waiting time of the decoder representing a time duration during which the decoder waits before determining or declaring a video frame to be lost or to be associated with lost data packets.

In some implementations, encoding the plurality of video frames of the video stream according to the size of the sliding frame window includes encoding the video stream as multiple interleaved sub-streams, each sub-stream representing a separate referencing chain of video frames. The multiple interleaved sub-streams can be independent of one another.

In some implementations, the plurality of video frames is a first plurality of video frames and the method can include updating the size of the sliding frame window and encoding a second plurality of video frames of the video stream according to the updated size of the sliding frame window, such that a distance or separation between any pair of video frames of the second plurality of video frames including a reference frame and a corresponding inter-frame is greater than or equal to the updated size of the sliding frame window.

In some implementations, the method can include receiving a message indicative of a first video frame that was previously transmitted and that is determined or declared to be lost or to be associated with lost data packets, identifying a set of video frames encoded as directly or indirectly dependent upon the first video frame, and invalidating the set of video frames encoded as directly or indirectly dependent upon the first video frame. In some implementations, the method can include receiving a message indicative of a first video frame that was previously transmitted and that is determined or declared to be lost or to be associated with lost data packets, identifying a set of video frames, if any, encoded as directly or indirectly dependent upon the first video frame, identifying a second video frame to be encoded as dependent upon the first video frame or upon another video frame of the set of video frames, and (i) dropping the second frame, (ii) encoding the second frame as an intra frame, or (iii) encoding the second frame as dependent upon another video frame different from the first video frame and different from the set of video frames.

According to yet another aspect, a computer readable medium can include computer code instructions stored thereon. The computer code instructions when executed by one or more processors cause the one or more processors to determine a size of a sliding frame window for a video stream, wherein the size of the sliding frame window represents a minimum distance or separation between reference frames and corresponding inter frames, and encode a plurality of video frames of the video stream according to the size of the sliding frame window, such that a distance or separation between any pair of video frames of the plurality of video frames, including a reference frame and a corresponding inter frame, is greater than or equal to the size of the sliding frame window.

According to yet another aspect, an application programming interface (API), to interface with an application executed using one or more processors, can cause the one or more processors to determine a size of a sliding frame window for a video stream, wherein the size of the sliding frame window represents a minimum distance or separation between reference frames and corresponding inter frames, and encode a plurality of video frames of the video stream according to the size of the sliding frame window, such that a distance or separation between any pair of video frames of the plurality of video frames, including a reference frame and a corresponding inter frame, is greater than or equal to the size of the sliding frame window.

BRIEF DESCRIPTION OF THE DRAWINGS

The present systems and methods for efficient error resilience in multimedia communication systems are described in detail below with reference to the attached drawing figures, wherein.

DETAILED DESCRIPTION

Figure 1:
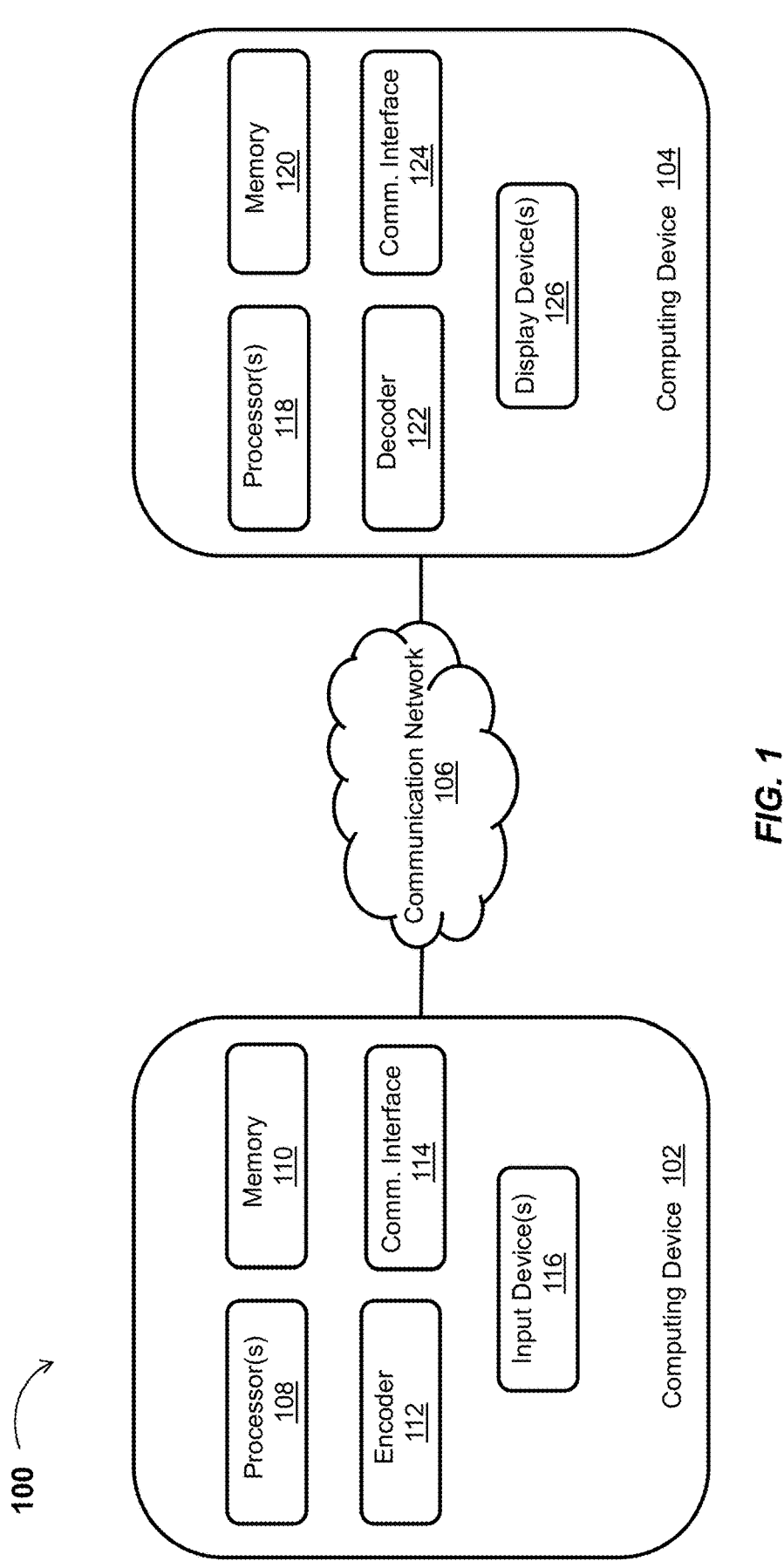
FIG. 1 shows an example multimedia communication system, in accordance with some embodiments of the current disclosure.

Systems, devices and methods are disclosed related to efficient error resilience in multimedia communication systems. Specifically, embodiments described in this disclosure relate to shaping a video stream as multiple interleaved referencing chains or sub-streams leading to efficient low delay error resilience over lossy communication networks.

In video compression, most video frames are usually encoded as inter frames. Each inter-frame is encoded using data from one or more corresponding reference frames. A video sequence is typically encoded as one or more consecutive and temporally non-overlapping referencing chains. Each referencing chain starts with an intra frame that is followed by a sequence of consecutive inter frames. Loss of one frame, or data packets thereof, of the referencing chain breaks the entire decoding chain at the decoder side.

In video streaming, when data packets of a video frame are lost, negative acknowledgment or other recovery mechanism is typically used to recover lost data packets. The decoder can send a request to the encoder for recovering lost data packets. However, while waiting for the lost data packets to be recovered, the decoder will receive additional inter frames that reference the video frame with lost data packets. The decoder can decide to either decode or drop the additional inter frames. Dropping the additional inter frames that reference the video frame with lost data packets results in video stutter, while decoding such additional inter frames leads to long lasting video corruption. Also, waiting for the lost data packets to be recovered before decoding the corresponding video frame and subsequent inter frames referencing the corresponding video frame leads to significant delay and interruptions in video playing. Furthermore, most video streaming systems implement frame recovery time-out schemes, after which recovery of the lost data packets is abandoned. The frame recovery timeout generally is defined based on round trip delay (RTD) between the encoder and decoder.

Systems and methods according to the current disclosure can shape the video stream as multiple interleaved and time-overlapping referencing chains or sub-streams. Specifically, an encoder or encoder device can design or enforce the distance or separation between each of the inter frames and corresponding reference frames to be greater than or equal to a certain number of consecutive video frames to allow more time for recovery. Increasing the distance or separation between a reference frame and any corresponding inter frames (or dependent frame) reduces the count or number of dependent frames in flight or already transmitted if the reference frame or packets thereof are lost. As such, decoding errors are spread temporally if the dependent frames associated with a lost reference frame are decoded. In the case where the dependent frames are dropped, the stutter is spread temporally. As used herein, the distance or separation are used interchangeably and can be defined or expressed in time units or as a number of video frames.

According to at least one aspect, an encoder device can determine a size of a sliding frame window for a video stream. The size of the sliding frame window can represent a minimum distance between reference frames and corresponding dependent inter frames. The encoding device can encode a plurality of video frames of the video stream according to the size of the sliding frame window, such that a distance between any pair of video frames of the plurality of video frames including a reference frame and a corresponding inter-frame is greater than or equal to the size of the sliding frame window. The size of the sliding frame window can be adaptive and can vary based on network conditions.

With reference to FIG. 1, FIG. 1 is an example of a multimedia communication system 100, in accordance with some embodiments of the current disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The multimedia communication system 100 includes a first computing device 102 and a second computing device 104, which are communicatively coupled via a communications network 106. The first computing device 102 and/or the second computing device 104 can initiate a streaming session, where the first computing device 102 transmits compressed media content, such as video content, to the second computing device 104 via the communication network 106. The media content transmitted by the first computing device 102 can be live content and/or recorded content. The media content can include podcasts, webcasts, movies, TV shows and/or music videos, among other forms of streaming content.

The first computing device 102 can include a computing server, such as a web server, a media server, a cloud server, a game server or an application server or a combination thereof, among others. The first computing device can be a client device, such as a desktop, a laptop, a camera device, a smart TV, a smart phone, a handheld device or a combination thereof, among others. While FIG. 1 shows only a pair of computing devices 102 and 104, in general, the streaming of multimedia content can involve any number of computing devices. For example, the computing device 102 can multicast or broadcast the media content to a plurality of computing devices. Also, the media content can be streamed by a plurality of computing devices.

The computing device 102 can transmit, unicast, multicast or broadcast the compressed media content via the communication network 106. The communications network 106 can include the Internet, one or more wireless communications networks, one or more WiFi networks, one or more local area networks (LANs), one or more wide area networks (WANs), a landline network or a combination thereof. Receiving devices, such as computing device 104, can receive the media content via the communication network 106.

The computing device 102 can include one or more processor(s) or processing units 108, a memory 110, an encoder 112, a communication interface 114 and one or more input devices 116. The processor(s) 108 can be configured to execute or implement instructions, commands, and/or control processes described herein with respect to the computing device 102. The processor(s) 108 may be implemented as a single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. The processor(s) 108 may be a microprocessor. The processor(s) 108 may be implemented as a combination of computing devices, such as a combination of a DSP and a microprocessor, a plurality of microprocessors, one or more microprocessors in conjunction with a DSP core, or any other such configuration. In some implementations, the one or more processors 108 may be configured to perform or otherwise execute certain operations independent of one or more co-processors. Two or more processors 108 may be coupled via a bus to enable independent, parallel, pipelined, or multi-threaded instruction execution. All such variations are intended to fall within the scope of the present disclosure.

The memory 110, also referred to herein as a memory unit and/or a storage device, can include one or more devices (e.g., RAM, ROM, Flash memory, hard disk storage) for storing data and/or computer code for performing or facilitating the various methods or processes described in the present disclosure. The memory 110 may be communicably connected to the processor(s) 108 to provide computer code or instructions and/or data items to the processor 108 for executing at least some of the processes or methods described herein. The memory 108 can be or can include tangible, non-transient volatile memory or non-volatile memory. Accordingly, the memory 108 can include or can store database components, object code components, script components, or any other type of information structure for supporting the various activities and information structures described herein.

The encoder 112 can be implemented as an electronic circuit or circuitry configured to encode or compress video data. The electronic circuit or circuitry can include one or more separate processors (e.g., separate from processor(s) 108) and a separate memory (e.g., separate from memory 110) for executing video compression steps or processes and/or methods or processes described herein. In some implementations, the encoder 112 can be implemented as computer instructions that are executed by processor(s) 108 and/or stored on memory 110. In some implementations, the encoder and/or methods or processes described herein can be performed or executed by a processor including one or more circuits.

The communication interface 114 is configured to enable or facilitate the exchange of data between the computing device 102 and other electronic devices such as computing device 104. The communication interface 114 can include any type of mobile communications interface or protocol including, but not limited to, Wi-Fi, WiMax, Internet, Radio, Bluetooth, Zigbee, satellite, radio, Cellular, GSM, GPRS, LTE, 5G and the like. The communication interface 114 can include any type and number of wired and/or wireless protocols (e.g., any standard under IEEE 802, etc.). The communication interface 114 can include a serial interface, a parallel interface or a combination thereof.

The computing device 102 can include or can be communicatively coupled to the input device(s) 116. The computing device 102 can receive or generate the video data via the input device(s) 116. For instance, the input device(s) 116 can include one or more camera devices. In some implementations, the computing device 102 can receive the vide data as input via a universal serial bus (USB) interface, a peripheral device, the communication interface 114, and store the video data in memory 110 for compression and streaming.

The computing device 104 can include one or more processors 118, a memory 120, a decoder 122 a communication interface 124 and one or more display devices 126. The processor(s) 118 can include any type of processor, e.g., as described in relation to processor(s) 108, and can be configured to execute or implement instructions, commands, and/or control processes associated with the computing device 104. The memory 120 can include any type and any number of storage devices (e.g., as described in relation to memory 110) for storing data and/or computer code for performing or facilitating various methods or processes associated with the computing device 104. The communication interface 124 can include any type or number of interface or protocol, e.g., as described above in relation with communication interface 114. The communication interface 124 is configured to enable or facilitate communication of the computing device 104 with other devices, such as computing device 102.

The decoder 122 can be implemented as an electronic circuit or circuitry configured to decode compressed video data, such as video received from the computing device 102. The electronic circuit or circuitry can include one or more separate processors (e.g., separate from processor(s) 118) and a separate memory (e.g., separate from memory 120) for executing video decoding steps or processes. In some implementations, the decoder 112 can be implemented as computer instructions that are executed by processor(s) 118 and/or stored on memory 120. In some implementations, the decoder can be performed or executed by a processor including one or more circuits. In streaming sessions, the decoder 122 can decode compressed video data received, e.g., received from computing device 102, in real time or near real time. As used herein, near real time refers to the timeliness of decoding the video data taking into account any delays due to electronic communication and/or automatic data processing.

The decoder 122 can provide decoded video data to the display device(s) 126 for rendering. The display device(s) 126 can include a computer monitor, a TV or TV screen, a liquid crystal display (LCD), a light-emitting diode (LED) display or any other type of display devices. The display device(s) 126 can part of or communicatively coupled to the computing device 104.

Figure 2:
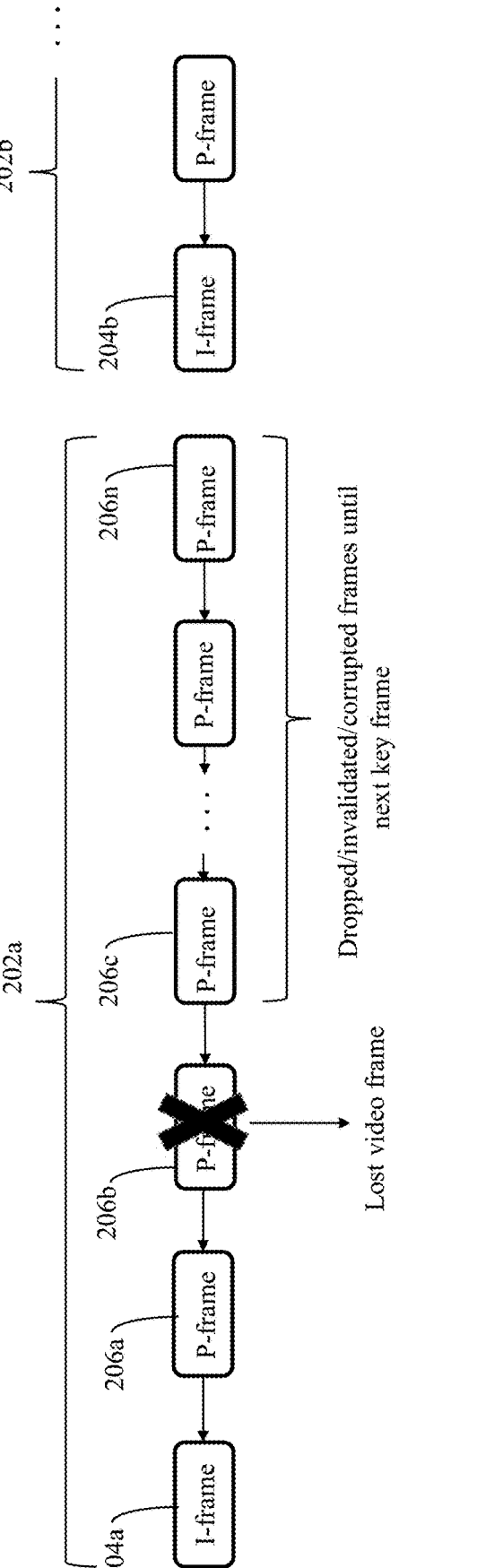
FIG. 2 shows a diagram illustrating a first approach for video frame referencing in video compression, in accordance with some embodiments of the current disclosure.

Referring now to FIG. 2, a portion of a sequence of video frames 200 is shown with inter-frames referencing immediately adjacent frames. The portion of the sequence 200 shown in FIG. 2 depicts two consecutive and non-interleaving referencing chains 202a and 202b. The referencing chain 202a starts with intra frame (I-frame) 204a and referencing chain 202b starts with I-frame 204b. The referencing chain 202a includes inter-predicted frames (P-frames) 206a-206n, each of which is predicted or encoded using the immediately preceding video frame. For instance, the encoder 112 encodes P-frame 206b using data from P-frame 206a, encodes P-frame 206c using data from P-frame 206b and so on and so forth. The referencing chain 202a ends when a new I-frame, e.g., I-frame 204b, is received.

In a case where a P-frame, e.g., P-frame 206b, of the referencing chain 202a is fully or partially lost (e.g., one or more packets thereof are lost) and not received by the computing device 104, the computing device 104 or the decoder 122 can send a message or signal, e.g., negative acknowledgement (NACK) message or signal, to the encoder 112 or the computing device 102. The message or signal can indicate the loss or non-reception of frame 206b. The message or signal can include or can be indicative of a request for a key frame or I-frame. The computing device 104 or the decoder 122 can send the message or signal once a predefined time period for frame recovery expires or is timed out. The predefined time period can be implementation—(e.g., application and/or decoder implementation) dependent. The predefined time period is usually defined based on the RTD between the encoder 112 and the decoder 122 or between computing devices 102 and 104.

During the predefined time period and until the next I-frame 204b is received, the computing device 104 receives additional compressed frames, e.g., frames 206c-206n, which depend either directly or indirectly on the lost frame 206b. As used herein, a first frame is directly dependent on a second frame if the first frame or a portion thereof is compressed using video data from the second frame. Direct dependency is illustrated by the arrows in FIG. 2. Also, the first frame is indirectly dependent on the second frame if there is a chain of dependency that goes from the first frame to the second frame. For instance, frame 206c is indirectly dependent on frame 206a since frame 206c is directly dependent on frame 206b which is directly dependent on frame 206a. Also, frame 206n is indirectly dependent on frame 206b because the chain of dependency 202a connects, e.g., via the arrows depicting direct dependency, the frame 206n to the frame 206b.

A decoder 122 may not be able to properly decode frames 206c-206n, which depend either directly or indirectly on the lost frame 206b. The decoder 122 can either drop or decode frames that are directly or indirectly dependent on lost frame(s). Dropping frames 206c-206n until the lost video frame 206b is recovered can cause stutter of video content rendered on the display device 126. Decoding the frames 206c-206n can lead to video corruption that can propagate through video frames 206c-206n. For instance, decoded frame 206c can include one or more corrupted data blocks which depend on lost data packets of the frame 206b. The one or more corrupted data blocks in decoded frame 206c can lead to a corruption in the following frame. The corruption can propagate through video frames 206c-206n depending on how data blocks in each frame are predicted from the corresponding reference frame. The larger the number of video frames (e.g., frames 206c-206n) that directly or indirectly depend on the lost video frame 206b until the next I-frame 204b, the longer and more noticeable the video stutter or corruption may result.

In existing approaches, the loss of a video frame breaks the entire decoding chain for subsequent frames that reference the lost frame. In video streaming applications, the decoder 122 may not wait for the lost frame to be recovered because such recovery can result in a relatively significant delay, e.g., compared to a time period for displaying a single frame. Such a delay leads to a temporary pause in the displayed video content. Dropping the frames, e.g., frames 206c-206n, dependent on the lost frame 206b until the lost frame 206b is recovered by the decoder 122 causes video stutter, while decoding the dependent video frames 206c-206n leads to video corruption in the dependent video frames.

To avoid or alleviate the effect of lost frames, the encoder 112 can encode the referencing chain shown in FIG. 2 as multiple independent and interleaved chains. When a frame is lost in one of the interleaved chains, the other interleaved chains and frames therein are not affected and can still be properly decoded. Also, the use of multiple interleaved chains provides the decoder 122 with more time for frame recovery by reducing the dependent frames count and spreading them temporally. Spreading the dependent frames temporarily causes video corruption to be spread temporally if the decoder 122 decodes the frames dependent on a lost frame. The phenomenon is referred to herein as temporal masking of the decoding errors. If the decoder 122 decides to drop frames dependent on the lost frame, the video stutter can be spread temporally due to lower frame rate of the frames dependent on the lost video frame.

Figure 3:
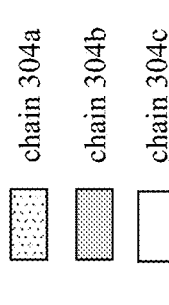
FIG. 3 shows a diagram illustrating a second approach for video frame referencing in video compression, in accordance with some embodiments of the current disclosure.
Figure 3:
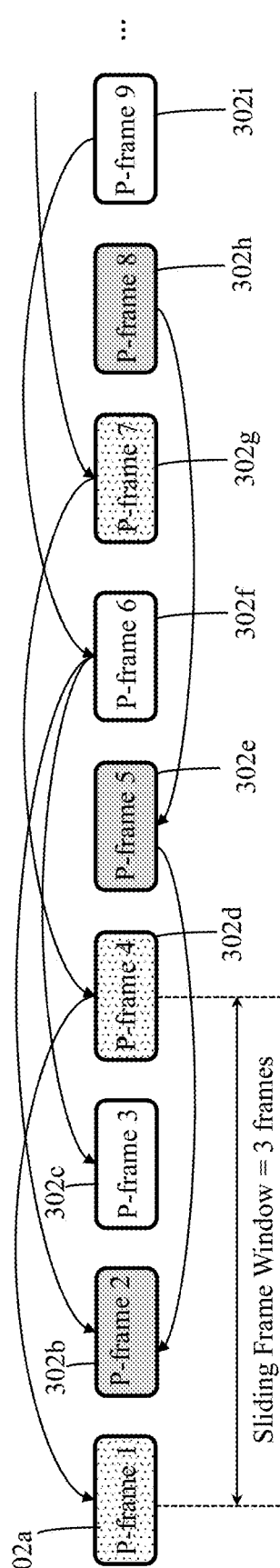

Referring now to FIG. 3, a portion of a sequence of video frames 300 depicting a different inter-frame referencing approach is shown, in accordance with some embodiments of the current disclosure. The sequence 300 includes P-frames 302a-302i. In compressing the portion of the sequence 300, the encoder 112 enforces a minimum distance or time interval between any inter-frame and the corresponding reference frame. The minimum distance or minimum time interval between any inter-frame and the corresponding reference frame is referred to herein as a sliding frame window. The sliding frame window can be defined or expressed in units of time (e.g., seconds) or as the number of frames (or number of frame periods) separating the inter-frame and the corresponding reference frame, e.g., as a difference between the index or order of the inter-frame and the index or order of the corresponding reference frame in the video sequence 300. The frame period is the reciprocal of the frame rate.

In the portion of the sequence 300, the sliding frame window is equal to 3 frames, which is the minimum separation between any inter-frame and the corresponding reference frame. For instance, P-frame 302a, which has an index equal to 1, is referenced only by P-frame 302*d*, which has an index equal to 4, and P-frame 302*d* is referenced only by P-frame 302*g*, which has an index equal to 7. Furthermore, P-frame 302*b*, which has an index equal to 2, is referenced only by P-frame 302*e*, which has an index equal to 5, and the latter is referenced only by P-frame 302*h*, which has an index equal to 8. Also, P-frame 302*c*, which has an index equal to 3 is referenced only by P-frame 302*f*, which has an index equal to 6, and the latter is referenced only by P-frame 302*i*, which has an index equal to 9.

The use of a sliding frame window equal to 3 frames leads to three independent and interleaved referencing chains (or sub-streams), namely referencing chains 304*a*, 304*b* and 304*c*. The referencing chains 304*a*, 304*b* and 304*c* are independent from one another because no frame in the chain 304*a* references any frame in chain 304*b* or chain 304*c*, no frame in the chain 304*b* references any frame in chain 304*a* or chain 304*c*, and no frame in the chain 304*c* references any frame in chain 304*a* or chain 304*b*. Accordingly, a lost frame in chain 304*a* may not affect the decoding of any frame in chains 304*b* and 304*c*. For example, if frame 302*d* is lost, it can affect the decoding of frame 302*g* and any other frames of chain 304*a* that are directly or indirectly dependent on frame 302*d*, but does not affect the decoding of any frame in chain 30*b* and/or chain 304*c*. Similarly, a lost frame in chain 304*b* does not affect the decoding of any frame in chains 304*a* and 304*c*. Also, a lost frame in chain 304*c* does not affect the decoding of any frame in chains 304*a* and 304*b*.

The referencing frame approach depicted in FIG. 3. As depicted in FIG. 3, enforcing a frame sliding window that is greater than 1, can lead to intermittent data loss and limited video stutter due to interleaving of video sub-streams or referencing chains. In particular, enforcing a frame sliding window that is greater than 1 or interleaved sub-streams causes temporal spreading of decoding errors due to loss of one or more video frames when inter-frames dependent, either directly or indirectly, on the lost video frame(s) are decoded by the decoder 122. In other words, the inter-frames dependent, either directly or indirectly, on the lost video frame(s) are not adjacent to one another compared, for example, to the case in FIG. 2. If the decoder 122 decides to drop the inter-frames that are dependent, either directly or indirectly, on the lost video frame(s), the use of a frame sliding window that is greater than 1 or the use of interleaved sub-streams, can mitigate (via temporal spreading) of video stutter such that the impact to the viewer may be reduced.

Figure 4:
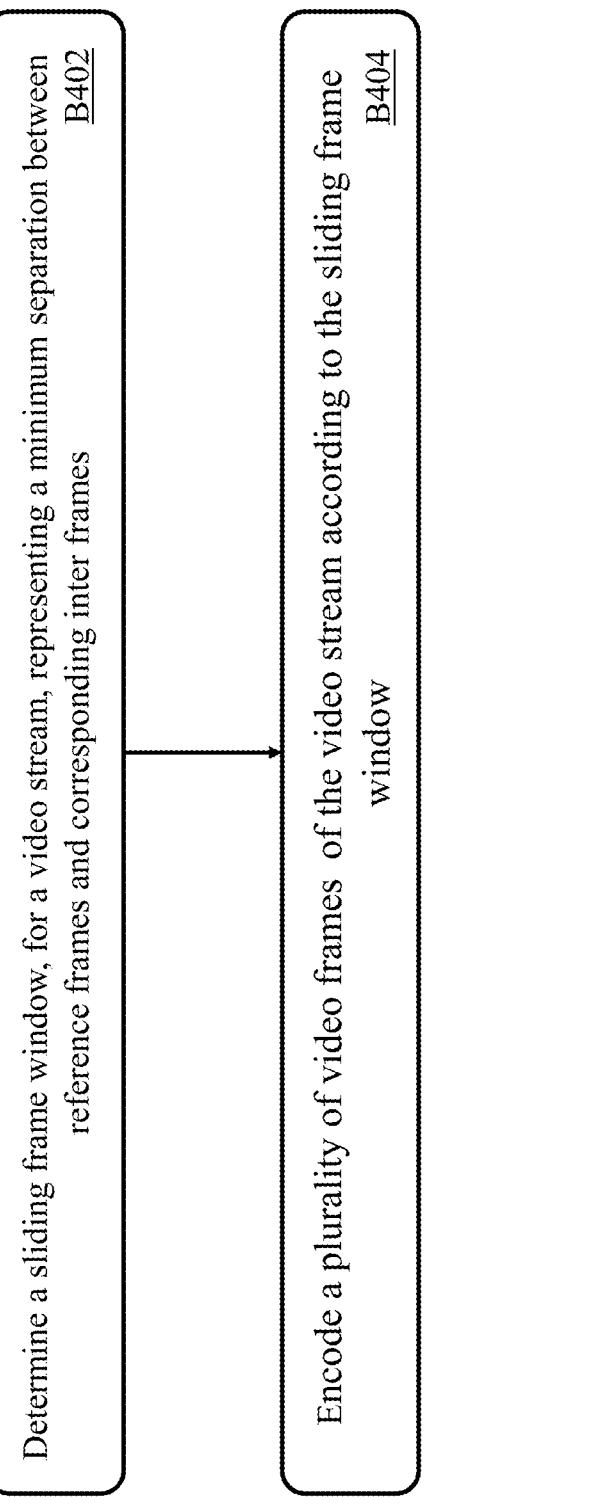
FIG. 4 shows a flow chart illustrating a method for video compression, in accordance with some embodiments of the present disclosure.

Now referring to FIG. 4, each block of method 400, described herein, comprises a computing process that may be performed using any combination of hardware, firmware, and/or software. For instance, various functions may be carried out by a processor executing instructions stored in memory. The method 400 may also be embodied as computer-usable instructions stored on computer storage media. The method 400 may be provided by a standalone application, a service or hosted service (standalone or in combination with another hosted service), or a plug-in to another product, to name a few. In addition, method 400 is described, by way of example, with respect to the system of FIG. 1. However, this method 400 may additionally or alternatively be executed by any one system, or any combination of systems, including, but not limited to, those described herein.

FIG. 4 is a flow chart illustrating a method 400 for encoding video data is shown, in accordance with some embodiments of the current disclosure. In brief overview, the method 400 can include, at block B402, determining a sliding frame window, for a video stream or video sequence, representing minimum separation between reference frames and corresponding inter-frames and, at block B404, encoding the video stream (or video sequence) according to the sliding frame window. The method 400 can be executed, performed, or implemented by the computing device 102 or the encoder 112.

The method 400 includes the computing device 102 or the encoder 112 determining, at block B402, a sliding frame window for the video stream or video sequence, or a size of the sliding frame window. The sliding frame window can represent the minimum separation or distance (e.g., as a number of intermediate frames, as time period) between any inter-frame and the corresponding reference frame. The size of the sliding frame window can be defined or determined as a minimum number of consecutive video frames (or a number of frame periods) separating the reference frame and the corresponding inter frame. The computing device 102 or the encoder 112 can determine the minimum number of consecutive video frames (or the minimum number of frame periods) separating the reference frame and the corresponding inter-frame to be greater than one.

The computing device 102 or the encoder 112 can determine B402 the sliding frame window adaptively or dynamically. For example, the computing device 102 or the encoder 112 can initially determine a first size of the sliding frame window and then update the size of the sliding frame window while the video stream or video sequence is being compressed. For example, the computing device 102 or the encoder 112 can initially determine the first size of the sliding frame window to be equal to 1 frame (or 1 frame period), and then update the size of the sliding frame window to be greater than 1 frame.

Figure 5:
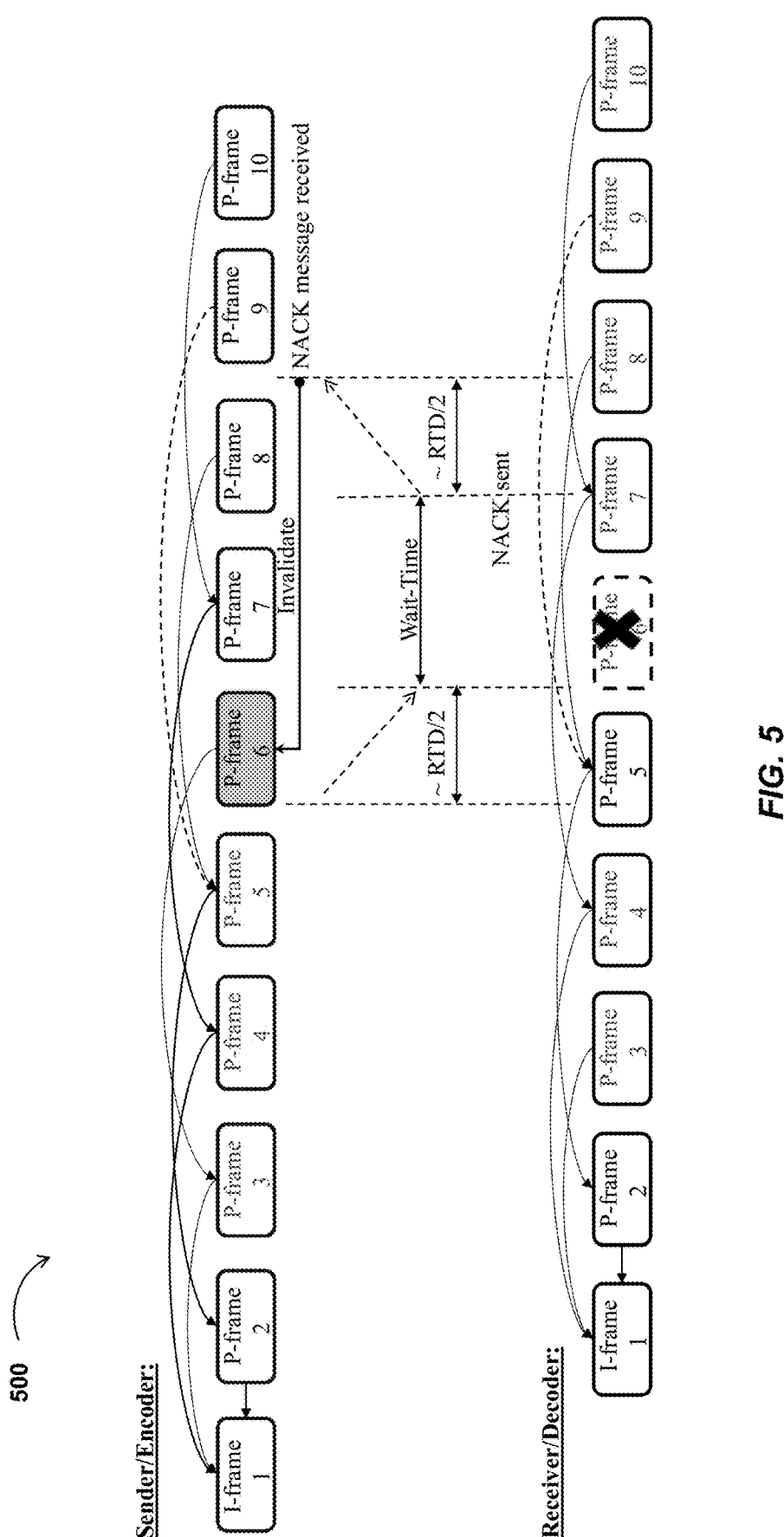
FIG. 5 shows a diagram illustrating frame referencing and error resilience from the perspective of a sender and a receiver, in accordance with some embodiments of the present disclosure.

Referring now to FIG. 5, a portion of a sequence of video frames 500 compressed and/or decoded according to interleaved sub-streams is shown, in accordance with some embodiments of the current disclosure. FIG. 5 depicts the processing or compression of the portion of the video sequence 500 at the encoder side (top instance of the sequence of video frames) and the processing or decoding of the portion of the video sequence 500 at the decoder side (bottom instance of the sequence of video frames). As illustrated at the encoder side, the computing device 102 or the encoder initially determines the sliding frame window to be equal to 1 frame. For example, the P-frame (inter-frame) with index 2 references the I-frame (intra-frame) with index 1. At the P-frame with index 3, the computing device 102 or the encoder 112 increases the size of the sliding frame window to be equal to 2 frames since the P-frame with index 3 references the I-frame with index 1. Starting from the P-frame with index 4, the computing device 102 or the encoder 112 determines the size of the sliding frame window to be equal to 3 frames. For example, the P-frame with index 4 references the I-frame with index 1, the P-frame with index 5 references the P-frame with index 2, the P-frame with index 6 references the P-frame with index 3, and so on and so forth.

In some implementations, determining the size of the sliding frame window can include the computing device 102 or the encoder 112 receiving a message, e.g., a NACK message, indicative of a previously transmitted video frame that is determined or declared to be lost or to be associated with lost data packets and/or determining a count of video frames transmitted after transmission of the previously transmitted video frame and before or until reception of the message. The computing device 102 or the encoder 112 can determine the size of the sliding frame window using (e.g., to be approximately equal to) the count of video frames transmitted after transmission of the lost frame and before or until reception of the message indicative of the lost video frame. The computing device 102 or the encoder 112 can receive the message indicative of the lost video frame from the computing device 104, the decoder 122 or some other computing or network device.

As shown in FIG. 5, when the P-frame with index equal to 6 is lost, the decoder 122 or the computing device 104 sends a NACK message back to the encoder 112 or the computing device 102 indicating the loss (or non-acknowledgement of the reception) of the frame. Starting from a time instance at which the lost frame is sent by the encoder 112 or the computing device 102, the decoder 122 or the computing device 104 can wait for RTD/2 (the travel time between the computing devices 102 and 104 or between the encoder 112 and the decoder 122) plus an additional wait-time (referred to herein as rtx) before sending the NACK message to the encoder 112 or the computing device 102. Accommodating for the wait-time rtx allows the receiving device 102 to ensure that all packets associated with the frame are received. The wait-time rtx may include packet retransmission time if the computing device 104 or some other device (e.g., network device) tries to recover lost data packets. The computing device 104 or the decoder 122 can determine a frame to be lost at about RTD/2+rtx after transmission of the frame by the computing device 102 or the encoder 112, and can send the NACK message at that time to the computing device 102 or the encoder 112. The NACK message can take about RTD/2 to reach the computing device 102 or the encoder 112.

Upon receiving the NACK message, the encoder 112 or the computing device 102 can determine a count of the video frames that were sent within the time interval between the time of transmission of the lost frame (e.g., frame with index equal to 6) and the time of reception of the NACK message. For example, the encoder 112 or the computing device 102 can determine that two video frames (e.g., P-frames indices 7 and 8) were transmitted during this time interval. The encoder 112 or the computing device 102 can determine the size of the sliding window by dividing the time interval between the time of transmission of the lost frame and the time of reception of the NACK message, by the product of the count of the transmitted frames (e.g., 2 frames) and the frame period, and can round up the result. That is, the encoder 112 or the computing device 102 can determine the size of the sliding window as:

$$W=\lceil T/(n \times \text{frame period}) \rceil,$$

where W is the sliding frame window, T is the time interval between the time of transmission of the lost frame and the time of reception of the NACK message, n is the count or number of frames transmitted during the time interval T and frame period is the reciprocal of the frame rate. Note that, in FIG. 5, T is equal to RTD+rtx. The operator or symbol $\lceil$ $\rceil$ represents the ceiling function. In the example depicted in FIG. 5, the sliding frame window W is equal to 3 frames (or 3 frame periods). It is to be noted that the computing device 102 or the encoder may not know the wait-time rtx.

In some implementations, determining the size of the sliding frame window can include the computing device 102 or the encoder 112 receiving a plurality of messages, where each message is indicative of a corresponding previously transmitted video frame that is declared/determined to be lost or to be associated with lost data packets. The plurality of messages can be a plurality of NACK messages, each of which is indicative of a corresponding lost video frame. The computing device 102 or the encoder 112 can determine, for each message of the plurality of messages, a corresponding count of video frames transmitted after transmission of the corresponding previously transmitted video frame and before reception of the message, and can determine the size of the sliding frame window using counts of video frames corresponding to the plurality of messages. The computing device 102 or the encoder 112 may compute a separate W (as described above) for each message, and can determine the final sliding frame window using the separate Ws computed for the received messages.

In some implementations, the computing device 102 or the encoder 112 can determine the size of the sliding frame window as an exponential average of counts of video frames or as an exponential average of Ws corresponding to the plurality of messages. The computing device 102 or the encoder 112 can determine the size of the sliding frame window as an average or a weighted average of the counts of the video frames (or of the Ws) corresponding to the plurality of messages. The computing device 102 or the encoder 112 may round the computed average to determine the size of the sliding frame window.

In some implementations, the computing device 102 or the encoder 112 can determine the size of the sliding frame window to be equal to an estimate of a sum of the RTD and the wait-time rtx. The wait-time rtx can represent a time duration during which the decoder 122 waits before declaring a video frame to be lost or to be associated with lost data packets. The computing device 102 or the encoder 112 can estimate the sum of the RTD and the wait-time rtx to be equal to the time interval between a first time instance at which a video frame is transmitted and a second time instance at which a message (e.g., a NACK message) indicating that the transmitted video frame was lost or is associated with lost data packets. In some implementations, the computing device 102 or the encoder 112 can estimate the sum of the RTD and the wait-time rtx to be equal to an average (e.g., average, weighted average or exponential average) of multiple time intervals, where each time interval is between a corresponding first time instance at which a video frame is transmitted and a corresponding second time instance at which a message (e.g., a NACK message) indicating that the transmitted video frame was lost or is associated with lost data packets.

In some implementations, the computing device 102 or the encoder 112 can enforce, implement or determine the distances between reference frames and corresponding inter frames to be smaller than or equal to a size of the decoded picture buffer (DPB) of the decoder 122. The encoder 112 or the computing device 102 can receive an indication of the DPB from the decoder 122 or the computing device 104. The DBP is expected to store decoded video frames that are to be used as reference frames for other video frames to be received by the decoder 122. Increasing the distance between inter frames and corresponding references frames can lead to an increase in the number of decoded frames to be stored by the DBP. Enforcing the distance between reference frames and corresponding inter frames to be smaller than or equal to the size of DPB can prevent overflow of the DPB and can ensure/facilitate proper decoding of the video sequence at the decoder 122.

Referring back to FIG. 4, the method 400 can include the computing device 102 or the encoder 112 encoding, at block 404 the video stream (or video sequence) according to the sliding frame window, such that the distance between any pair of video frames of the plurality of video frames including a reference frame and a corresponding inter-frame is greater than or equal to the size of the sliding frame window. The computing device 102 or the encoder 112 can encode and/or compress the plurality of video frames of the video sequence with a separation or distance between any interframe and the corresponding reference frame being greater than or equal to the sliding frame window. Referring back to FIG. 5, the P-frames with indices 3-10 are encoded and/or compressed with a sliding frame window equal to 3.

Encoding the video sequence according to the sliding frame window includes the computing device 102 or the encoder 112 encoding the video sequence (or video stream) as multiple interleaved sub-streams (or multiple interleaved referencing chains). For example, the portion of the video sequence 300 of FIG. 3 is encoded as three interleaved video streams (or referencing chains) 304a-304c. In FIG. 5, the video sequence 500 is also compressed as three interleaved sub-streams or referencing chains. A first sub-stream includes the frames with indices 1, 2, 5, 8, 9. A second sub-stream includes the frames with indices 1, 4, 7 and 10. A third sub-stream includes the frames with indices 1, 3 and 6. The multiple interleaved sub-streams can be independent of one another. For example, the sub-streams 304a-304c of FIG. 3 are independent of one another because for each sub-stream, the corresponding inter frames reference only frames in the same sub-stream. The sub-streams in FIG. 5 share only the I-frame with index equal to 1. Apart from the first frame, e.g., the I-frame with index equal to 1, no frame in any of the interleaved sub-streams of FIG. 5 is referenced by a frame in a different sub-stream. In other words, starting from the P-frame with index equal to 2, the interleaved sub-streams of FIG. 5 are independent of each other.

In some implementations, the computing device 102 or the encoder 112 can receive a message indicative of a first video frame that was previously transmitted and that is declared/determined to be lost or to be associated with lost data packets. The computing device 102 or the encoder 112 can identify a set of video frames encoded as directly or indirectly dependent upon the first video frame, and can invalidate the set of video frames encoded as directly or indirectly dependent upon the first video frame. In some implementations, the computing device 102 or the encoder 112 can receive the message indicative of the first video frame that was previously transmitted and that is declared to be lost or to be associated with lost data packets. The computing device 102 or the encoder 112 can identify a set of video frames, if any, encoded as directly or indirectly dependent upon the first video frame, and can identify a second video frame to be encoded as dependent upon the first video frame or upon another video frame of the set of video frames. The computing device 102 or the encoder 112 can (i) drop the second frame, (ii) encode the second frame as an intra frame, or (iii) encode the second frame as dependent upon another video frame different from the first video frame and different from the set of video frames.

Referring back to FIG. 5, upon determining that the P-frame with index equal to 6 is lost, the computing device 104 or the decoder 122 can send a message, e.g., a NACK message, to the computing device 102 or the encoder 112 indicating the loss of the P-frame with index equal to 6. The message is received by the computing device 102 or the encoder 112 at RTD+rtx after transmission of the same frame (e.g., frame with index equal to 6). The message can be viewed as a request to the encoder 112 to invalidate the lost frame and any other compressed or transmitted frames that are either directly or indirectly dependent on the lost frame. In response to receiving the message, the encoder 112 or the computing device 102 invalidates the lost frame so that it is not used as a reference frame for other frames to be encoded. The encoder 112 or the computing device 102 also determines already compressed or transmitted video frames which directly or indirectly depend on the lost frame, if any, to be invalidated. In the case depicted in FIG. 5, only the frames with indices 7 and 8 are already compressed or transmitted by the time the encoder 112 or the computing device 102 receives the message indicative of the loss of the frame with index equal to 6. Both of these frames having indices 7 and 8 do not depend on the lost frame having an index equal to 6.

As depicted in the example in FIG. 5, when the sliding frame window (also referred to herein as the sliding reference window) is large enough to cover the roundtrip delay (RTD) plus the wait-time rtx, e.g., the sliding reference window is greater than or equal to (RTD+rtx), the loss can be limited to a single frame at the receiver side. In particular, in FIG. 5 only the frame with index equal to 6 is lost. The encoder 112 or the computing device 102 can determine that the frame with index equal to 9 is to be encoded (after reception of the message indicative of the loss of the frame with index equal to 6) as dependent on the lost frame. Since the lost frame was already invalidated, the encoder 112 encodes the frame with index equal to 9 as dependent on the frame with index equal to 5 instead of being dependent on the lost frame. In some implementations, the encoder 112 can encode the frame with index equal to 9 as an I-frame or can drop the frame. When the encoder 112 drops a frame, the dropped frame is not transmitted to the computing device 104 or the decoder 122.

Figure 6:
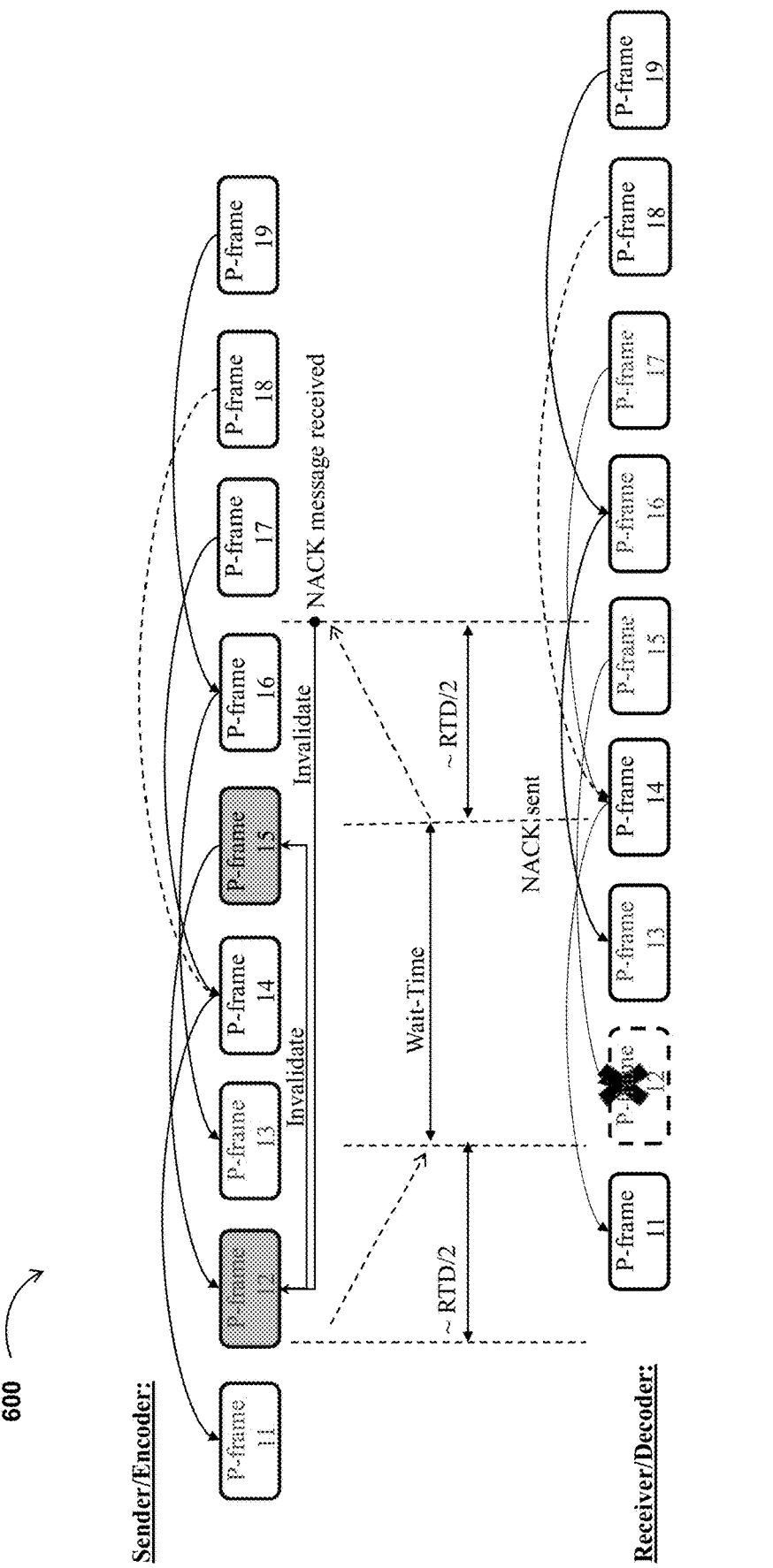
FIG. 6 shows another diagram illustrating frame referencing and error resilience from the perspective of the sender and the receiver, in accordance with some embodiments of the present disclosure.

Referring now to FIG. 6, a portion of a sequence of video frames 600 compressed and/or decoded according to interleaved sub-streams is shown, in accordance with some embodiments of the current disclosure. FIG. 6 depicts a similar scenario as illustrated in FIG. 5, except that in FIG. 6 the sliding reference window is smaller than RTD+rtx. The sliding frame window is equal to 3 frames (or 3 frame periods) and (RTD+rtx) is greater than 5 frames (or 5 frame periods). The frame with index equal to 12 is lost and is not received by the computing device 104 or the decoder 122. At about (RTD/2+rtx) after transmission of the P-frame with index equal to 12, the decoder 122 or the computing device 104 can declare (e.g., determine, consider, indicate, identify) the frame with index equal to 12 to be lost (or to have lost data packets) and can send a message indicative of the loss of the frame to the computing device 102 or the encoder 112. The message can be a NACK message and/or can be viewed as (or can include) a request to invalidate the lost frame and any compressed/transmitted frames that depend on the lost frame. The encoder 112 or the computing device 102 can receive the message about RTD/2 later (after the transmission of the message by the encoder 112).

Upon receiving the message, the encoder 112 or the computing device 102 can invalidate the P-frame with index equal to 12 (the lost frame). When a frame is invalidated, the encoder 112 or the device 102 may not use the invalidated frame as a reference frame when encoding other frames. The encoder 112 or the computing device 102 can track back already compressed and/or transmitted frames to identify/determine any frames that depend directly or indirectly on the invalidated frame. In this case, the encoder 112 or the computing device 102 can determine that the P-frame having index equal to 15 was encoded as dependent on the lost frame (P-frame with index equal to 12), and can invalidate the P-frame with index equal to 15. No other compressed or transmitted frames that are dependent on the P-frames with indices 12 and 15 (e.g., invalidated frames) are identified.

The encoder 112 or the computing device 102 can also determine that the frame with index equal to 18 is to be encoded (e.g., after reception of the message) as dependent on the P-frame having index equal to 15. However, since the P-frame having index equal to 15 was already invalidated, the encoder 112 or the computing device 102 encodes the frame with index equal to 18 as dependent on another frame that is not invalidated, e.g., the P-frame having index equal to 14. In some implementations, the encoder 112 or the computing device 102 can encode the frame with index equal to 18 as an I-frame. In some other implementations, the encoder 112 or the computing device 102 can drop the frame with index equal to 18. If the frame with index equal to 18 is dropped, the encoder 112 or the computing device 102 can also invalidate the frame with index equal to 18 so that no other frame may be encoded as dependent on the frame with index equal to 18.

In some implementations, the encoder 112 or the computing device 102 can update the size of the sliding frame window and can encode a second plurality of video frames of the video stream according to the updated size of the sliding frame window. The encoder 112 or the computing device 102 can update the size of the sliding reference window regularly, responsive to some event (e.g., receiving a message indicative of a lost frame), or a combination of both, among others. Once the sliding reference window is updated, the encoder 112 or the computing device 102 can encode the following frames using the updated sliding reference window, such that distances between inter-frames and corresponding reference frames are greater than or equal to the updated sliding reference window.

For example, the portion of the video sequence 600 in FIG. 6 can be viewed as a continuation of the portion of the video sequence 500 in FIG. 5. The encoder 112 or the computing device 102 can determine or update the sliding reference window responsive to the loss of the P-frame with index equal to 6. The encoder 112 or the computing device 102 can determine/define/establish or update/adjust the sliding reference window responsive to the loss of the P-frame with index equal to 12. In some implementations, the encoder 112 or the computing device 102 may increase the size of the sliding reference window after determining, based on the message indicative of the loss of the frame with index 12, that (RTD+rtx) has increased. It is to be noted, that encoder 112 or the computing device 102 may not increase the sliding reference window beyond the size of the DPB.

In some implementations, the frame referencing described in FIGS. 3-6 can be implemented by the encoder 112 or the computing device 102 as a separate frame referencing mode, e.g., interleaved mode. The encoder 112 or the computing device 102 can switch or alternate between a default frame referencing mode and the interleaved mode. It is to be noted that embodiments described herein are also applicable to video sequences or video segments including bidirectional frames (B-frames).

Example Content Streaming System

Figure 7:
FIG. 7 shows an example system diagram for a content streaming system, in accordance with some embodiments of the present disclosure.
Figure 7:
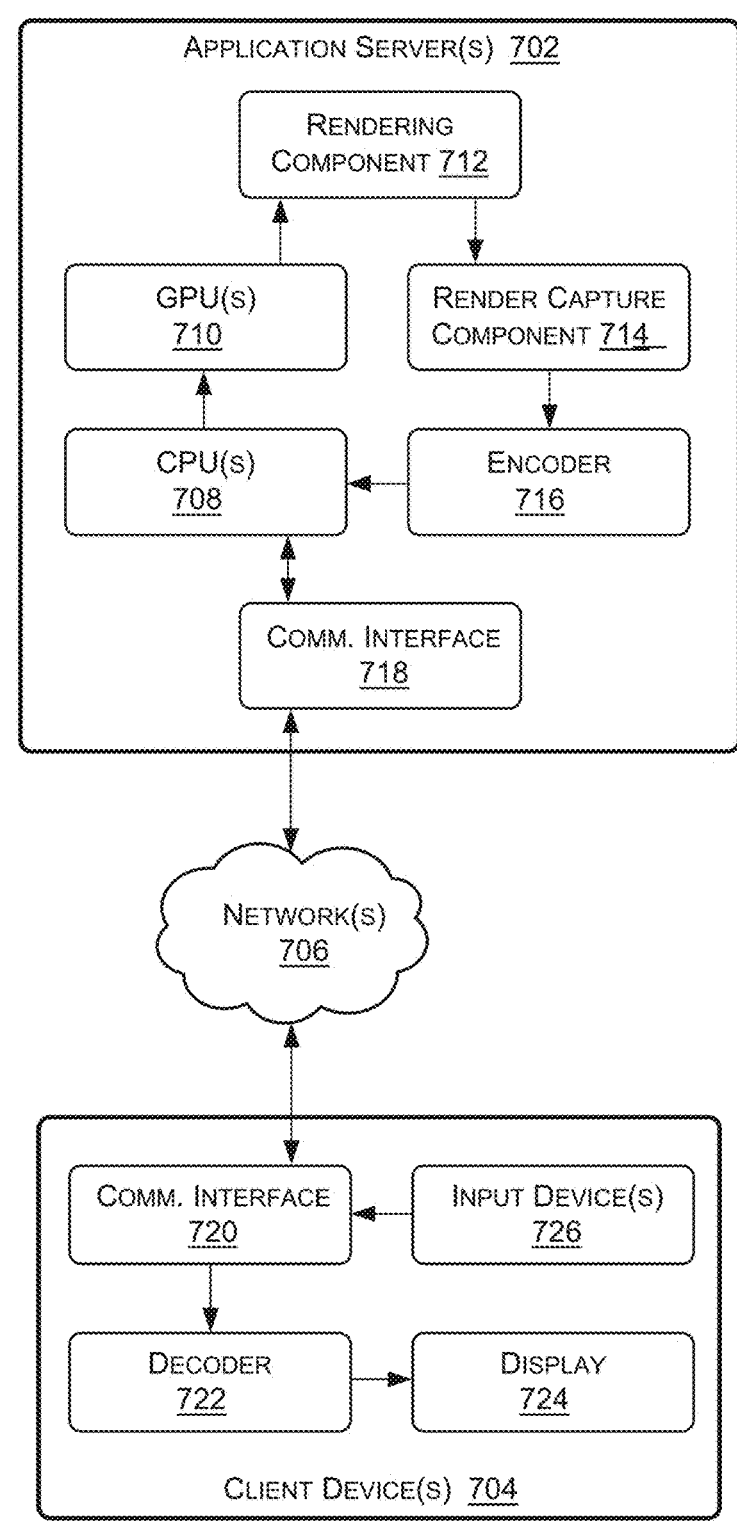

Now referring to FIG. 7, FIG. 7 is an example system diagram for a content streaming system 700, in accordance with some embodiments of the present disclosure. FIG. 7 includes application server(s) 702 (which may include similar components, features, and/or functionality to the example computing device 800 of FIG. 8), client device(s) 704 (which may include similar components, features, and/or functionality to the example computing device 800 of FIG. 8), and network(s) 706 (which may be similar to the network(s) described herein). In some embodiments of the present disclosure, the system 700 may be implemented. The application session may correspond to a game streaming application (e.g., NVIDIA GEFORCE NOW), a remote desktop application, a simulation application (e.g., autonomous or semi-autonomous vehicle simulation), computer aided design (CAD) applications, virtual reality (VR) and/or augmented reality (AR) streaming applications, deep learning applications, and/or other application types.

In the system 700, for an application session, the client device(s) 704 may only receive input data in response to inputs to the input device(s), transmit the input data to the application server(s) 702, receive encoded display data from the application server(s) 702, and display the display data on the display 1024. As such, the more computationally intense computing and processing is offloaded to the application server(s) 702 (e.g., rendering—in particular ray or path tracing—for graphical output of the application session is executed by the GPU(s) of the game server(s) 702). In other words, the application session is streamed to the client device(s) 704 from the application server(s) 702, thereby reducing the requirements of the client device(s) 704 for graphics processing and rendering.

For example, with respect to an instantiation of an application session, a client device 704 may be displaying a frame of the application session on the display 724 based on receiving the display data from the application server(s) 702. The client device 704 may receive an input to one of the input device(s) and generate input data in response. The client device 704 may transmit the input data to the application server(s) 702 via the communication interface 720 and over the network(s) 706 (e.g., the Internet), and the application server(s) 702 may receive the input data via the communication interface 718. The CPU(s) may receive the input data, process the input data, and transmit data to the GPU(s) that causes the GPU(s) to generate a rendering of the application session. For example, the input data may be representative of a movement of a character of the user in a game session of a game application, firing a weapon, reloading, passing a ball, turning a vehicle, etc. The rendering component 712 may render the application session (e.g., representative of the result of the input data) and the render capture component 714 may capture the rendering of the application session as display data (e.g., as image data capturing the rendered frame of the application session). The rendering of the application session may include ray or path-traced lighting and/or shadow effects, computed using one or more parallel processing units-such as GPUs, which may further employ the use of one or more dedicated hardware accelerators or processing cores to perform ray or path-tracing techniques—of the application server(s) 702. In some embodiments, one or more virtual machines (VMs)—e.g., including one or more virtual components, such as vGPUs, vCPUs, etc.—may be used by the application server(s) 702 to support the application sessions. The encoder 716 may then encode the display data to generate encoded display data and the encoded display data may be transmitted to the client device 704 over the network(s) 706 via the communication interface 718. The client device 704 may receive the encoded display data via the communication interface 720 and the decoder 722 may decode the encoded display data to generate the display data. The client device 704 may then display the display data via the display 724.

Example Computing Device

Figure 8:
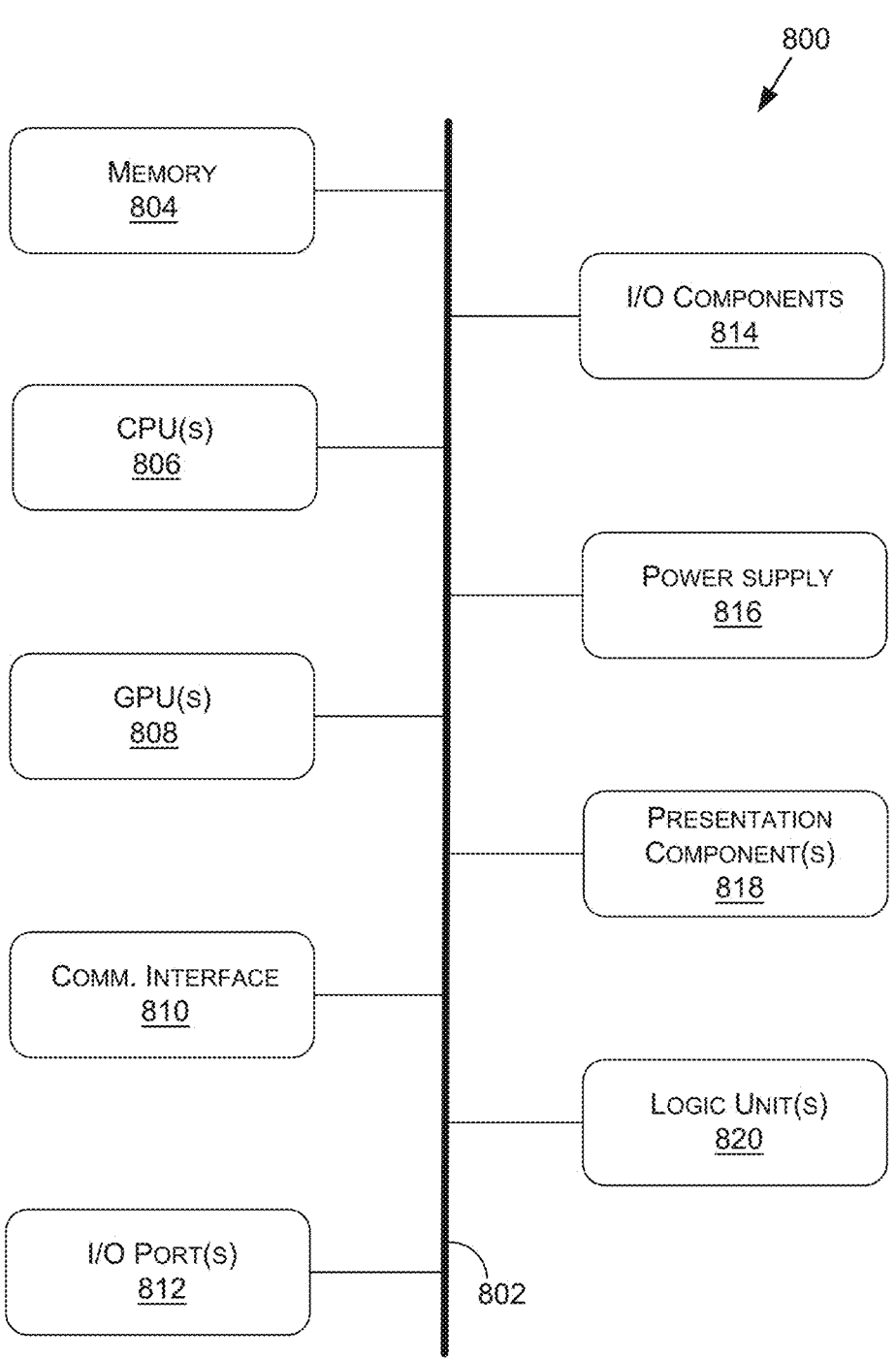
FIG. 8 shows a block diagram of an example computing device(s) suitable for use in implementing some embodiments of the present disclosure.

FIG. 8 is a block diagram of an example computing device(s) 800 suitable for use in implementing some embodiments of the present disclosure. Computing device 800 may include an interconnect system 802 that directly or indirectly couples the following devices: memory 804, one or more central processing units (CPUs) 806, one or more graphics processing units (GPUs) 808, a communication interface 810, input/output (I/O) ports 812, input/output components 814, a power supply 816, one or more presentation components 818 (e.g., display(s)), and one or more logic units 820. In at least one embodiment, the computing device(s) 800 may comprise one or more virtual machines (VMs), and/or any of the components thereof may comprise virtual components (e.g., virtual hardware components). For non-limiting examples, one or more of the GPUs 808 may comprise one or more vGPUs, one or more of the CPUs 806 may comprise one or more vCPUs, and/or one or more of the logic units 820 may comprise one or more virtual logic units. As such, a computing device(s) 800 may include discrete components (e.g., a full GPU dedicated to the computing device 800), virtual components (e.g., a portion of a GPU dedicated to the computing device 800), or a combination thereof.

Although the various blocks of FIG. 8 are shown as connected via the interconnect system 802 with lines, this is not intended to be limiting and is for clarity only. For example, in some embodiments, a presentation component 818, such as a display device, may be considered an I/O component 814 (e.g., if the display is a touch screen). As another example, the CPUs 806 and/or GPUs 808 may include memory (e.g., the memory 804 may be representative of a storage device in addition to the memory of the GPUs 808, the CPUs 806, and/or other components). In other words, the computing device of FIG. 8 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 8.

The interconnect system 802 may represent one or more links or busses, such as an address bus, a data bus, a control bus, or a combination thereof. The interconnect system 802 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 806 may be directly connected to the memory 804. Further, the CPU 806 may be directly connected to the GPU 808. Where there is direct, or point-to-point connection between components, the interconnect system 802 may include a PCIe link to carry out the connection. In these examples, a PCI bus need not be included in the computing device 800.

The memory 804 may include any of a variety of computer-readable media. The computer-readable media may be any available media that may be accessed by the computing device 800. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 804 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 800. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 806 may be configured to execute at least some of the computer-readable instructions to control one or more components of the computing device 800 to perform one or more of the methods and/or processes described herein. The CPU(s) 806 may each include one or more cores (e.g., one, two, four, eight, twenty-eight, seventy-two, etc.) that are capable of handling a multitude of software threads simultaneously. The CPU(s) 806 may include any type of processor, and may include different types of processors depending on the type of computing device 800 implemented (e.g., processors with fewer cores for mobile devices and processors with more cores for servers). For example, depending on the type of computing device 800, the processor may be an Advanced RISC Machines (ARM) processor implemented using Reduced Instruction Set Computing (RISC) or an x86 processor implemented using Complex Instruction Set Computing (CISC). The computing device 800 may include one or more CPUs 806 in addition to one or more microprocessors or supplementary co-processors, such as math co-processors.

In addition to or alternatively from the CPU(s) 806, the GPU(s) 808 may be configured to execute at least some of the computer-readable instructions to control one or more components of the computing device 800 to perform one or more of the methods and/or processes described herein. One or more of the GPU(s) 808 may be an integrated GPU (e.g., with one or more of the CPU(s) 806 and/or one or more of the GPU(s) 808 may be a discrete GPU. In embodiments, one or more of the GPU(s) 808 may be a coprocessor of one or more of the CPU(s) 806. The GPU(s) 808 may be used by the computing device 800 to render graphics (e.g., 3D graphics) or perform general purpose computations. For example, the GPU(s) 808 may be used for General-Purpose computing on GPUs (GPGPU). The GPU(s) 808 may include hundreds or thousands of cores that are capable of handling hundreds or thousands of software threads simultaneously. The GPU(s) 808 may generate pixel data for output images in response to rendering commands (e.g., rendering commands from the CPU(s) 806 received via a host interface). The GPU(s) 808 may include graphics memory, such as display memory, for storing pixel data or any other suitable data, such as GPGPU data. The display memory may be included as part of the memory 804. The GPU(s) 808 may include two or more GPUs operating in parallel (e.g., via a link). The link may directly connect the GPUs (e.g., using NVLINK) or may connect the GPUs through a switch (e.g., using NVSwitch). When combined together, each GPU 808 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 806 and/or the GPU(s) 808, the logic unit(s) 820 may be configured to execute at least some of the computer-readable instructions to control one or more components of the computing device 800 to perform one or more of the methods and/or processes described herein. In embodiments, the CPU(s) 806, the GPU(s) 808, and/or the logic unit(s) 820 may discretely or jointly perform any combination of the methods, processes and/or portions thereof. One or more of the logic units 820 may be part of and/or integrated in one or more of the CPU(s) 806 and/or the GPU(s) 808 and/or one or more of the logic units 820 may be discrete components or otherwise external to the CPU(s) 806 and/or the GPU(s) 808. In embodiments, one or more of the logic units 820 may be a coprocessor of one or more of the CPU(s) 806 and/or one or more of the GPU(s) 808.

Examples of the logic unit(s) 820 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 810 may include one or more receivers, transmitters, and/or transceivers that enable the computing device 800 to communicate with other computing devices via an electronic communication network, included wired and/or wireless communications. The communication interface 810 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 820 and/or communication interface 810 may include one or more data processing units (DPUs) to transmit data received over a network and/or through interconnect system 802 directly to (e.g., a memory of) one or more GPU(s) 808.

The I/O ports 812 may enable the computing device 800 to be logically coupled to other devices including the I/O components 814, the presentation component(s) 818, and/or other components, some of which may be built in to (e.g., integrated in) the computing device 800. Illustrative I/O components 814 include a microphone, mouse, keyboard, joystick, game pad, game controller, satellite dish, scanner, printer, wireless device, etc. The I/O components 814 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 800. The computing device 800 may be include depth cameras, such as stereoscopic camera systems, infrared camera systems, RGB camera systems, touchscreen technology, and combinations of these, for gesture detection and recognition. Additionally, the computing device 800 may include accelerometers or gyroscopes (e.g., as part of an inertia measurement unit (IMU)) that enable detection of motion. In some examples, the output of the accelerometers or gyroscopes may be used by the computing device 800 to render immersive augmented reality or virtual reality.

The power supply 816 may include a hard-wired power supply, a battery power supply, or a combination thereof. The power supply 816 may provide power to the computing device 800 to enable the components of the computing device 800 to operate.

The presentation component(s) 818 may include a display (e.g., a monitor, a touch screen, a television screen, a heads-up-display (HUD), other display types, or a combination thereof), speakers, and/or other presentation components. The presentation component(s) 818 may receive data from other components (e.g., the GPU(s) 808, the CPU(s) 806, DPUs, etc.), and output the data (e.g., as an image, video, sound, etc.).

Example Data Center

Figure 9:
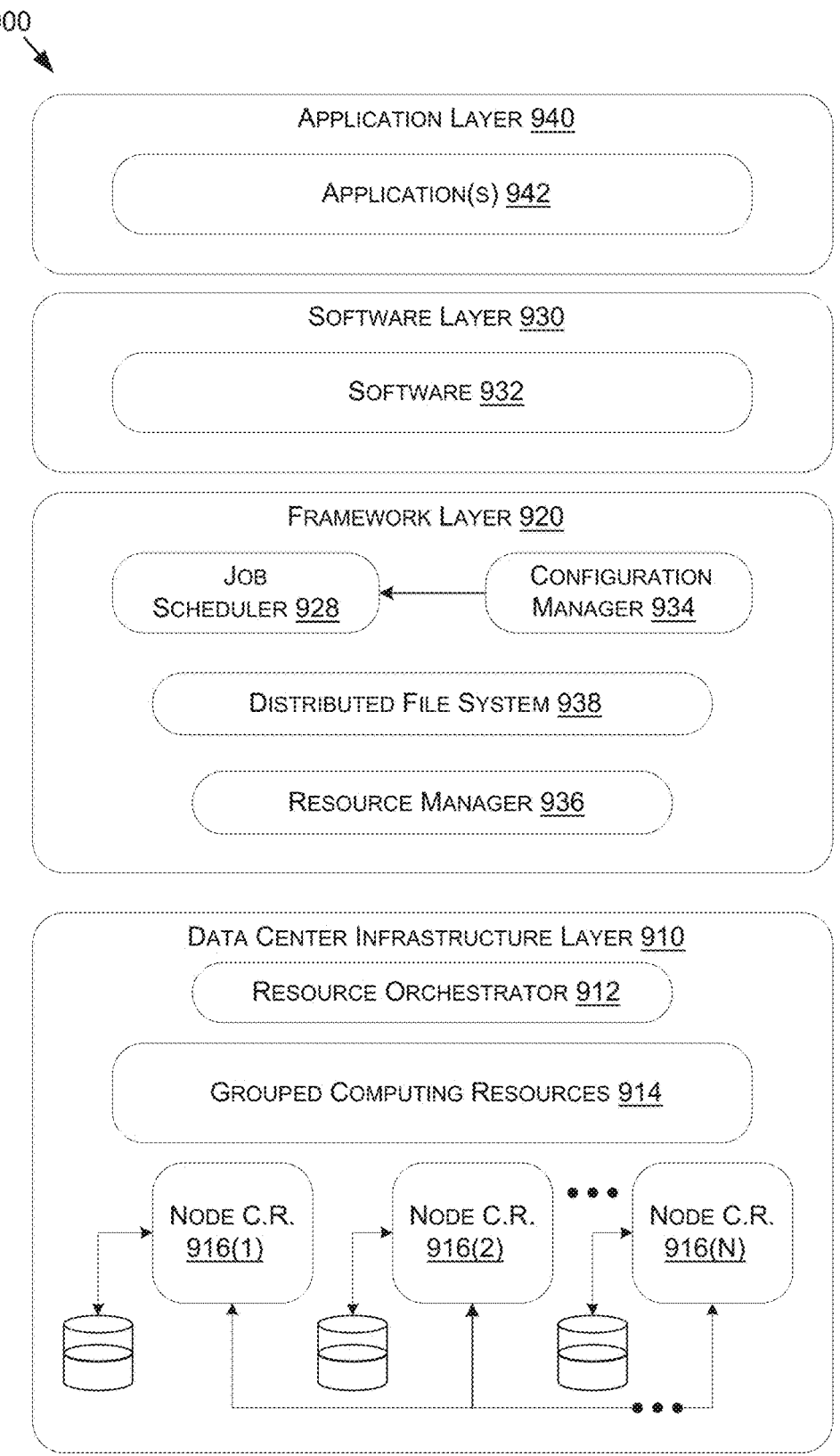
FIG. 9 shows an example data center that may be used in at least one embodiment of the present disclosure.

FIG. 9 illustrates an example data center 900 that may be used in at least one embodiment of the present disclosure. The data center 900 may include a data center infrastructure layer 910, a framework layer 920, a software layer 930, and/or an application layer 940.

As shown in FIG. 9, the data center infrastructure layer 910 may include a resource orchestrator 912, grouped computing resources 914, and node computing resources ("node C.R.s") 916(1)-916(N), where "N" represents any whole, positive integer. In at least one embodiment, node C.R.s 916(1)-916(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 916(1)-916(N) may correspond to a server having one or more of the above-mentioned computing resources. In addition, in some embodiments, the node C.R.s 916(1)-9161(N) may include one or more virtual components, such as vGPUs, vCPUs, and/or the like, and/or one or more of the node C.R.s 916(1)-916(N) may correspond to a virtual machine (VM).

In at least one embodiment, grouped computing resources 914 may include separate groupings of node C.R.s 916 housed within one or more racks (not shown), or many racks housed in data centers at various geographical locations (also not shown). Separate groupings of node C.R.s 916 within grouped computing resources 914 may include grouped compute, network, memory or storage resources that may be configured or allocated to support one or more workloads. In at least one embodiment, several node C.R.s 916 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 912 may configure or otherwise control one or more node C.R.s 916(1)-916(N) and/or grouped computing resources 914. In at least one embodiment, resource orchestrator 912 may include a software design infrastructure (SDI) management entity for the data center 900. The resource orchestrator 912 may include hardware, software, or some combination thereof.

In at least one embodiment, as shown in FIG. 9, framework layer 920 may include a job scheduler 928, a configuration manager 934, a resource manager 936, and/or a distributed file system 938. The framework layer 920 may include a framework to support software 932 of software layer 930 and/or one or more application(s) 942 of application layer 940. The software 932 or application(s) 942 may respectively include web-based service software or applications, such as those provided by Amazon Web Services, Google Cloud and Microsoft Azure. The framework layer 920 may be, but is not limited to, a type of free and open-source software web application framework such as Apache Spark™ (hereinafter "Spark") that may utilize distributed file system 938 for large-scale data processing (e.g., "big data"). In at least one embodiment, job scheduler 928 may include a Spark driver to facilitate scheduling of workloads supported by various layers of data center 900. The configuration manager 934 may be capable of configuring different layers such as software layer 930 and framework layer 920 including Spark and distributed file system 938 for supporting large-scale data processing. The resource manager 936 may be capable of managing clustered or grouped computing resources mapped to or allocated for support of distributed file system 938 and job scheduler 928. In at least one embodiment, clustered or grouped computing resources may include grouped computing resource 914 at data center infrastructure layer 910. The resource manager 936 may coordinate with resource orchestrator 912 to manage these mapped or allocated computing resources.

In at least one embodiment, software 932 included in software layer 930 may include software used by at least portions of node C.R.s 916(1)-916(N), grouped computing resources 914, and/or distributed file system 938 of framework layer 920. One or more types of software may include, but are not limited to, Internet web page search software, e-mail virus scan software, database software, and streaming video content software.

In at least one embodiment, application(s) 942 included in application layer 940 may include one or more types of applications used by at least portions of node C.R.s 916(1)-916(N), grouped computing resources 914, and/or distributed file system 938 of framework layer 920. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 934, resource manager 936, and resource orchestrator 912 may implement any number and type of self-modifying actions based on any amount and type of data acquired in any technically feasible fashion. Self-modifying actions may relieve a data center operator of data center 900 from making possibly bad configuration decisions and possibly avoiding underutilized and/or poor performing portions of a data center.

The data center 900 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 900. In at least one embodiment, trained or deployed machine learning models corresponding to one or more neural networks may be used to infer or predict information using resources described above with respect to the data center 900 by using weight parameters calculated through one or more training techniques, such as but not limited to those described herein.

In at least one embodiment, the data center 900 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 800 of FIG. 8—e.g., each device may include similar components, features, and/or functionality of the computing device(s) 800. In addition, where backend devices (e.g., servers, NAS, etc.) are implemented, the backend devices may be included as part of a data center 900, an example of which is described in more detail herein with respect to FIG. 9.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 800 described herein with respect to FIG. 8. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a work-station, an edge device, any combination of these delineated devices, or any other suitable device.

The systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A processor, comprising:
   one or more circuits to:
      determine a size of a sliding frame window for a video stream comprising reference frames and inter frames, at least one inter frame of the inter frames comprising a reference to a reference frame of the reference frames that precedes the at least one inter frame in the video stream, wherein the size of the sliding frame window represents a minimum separation between the at least one inter frame and a corresponding reference frame, wherein the size of the sliding frame window is determined based at least on message timing data associated with one or more indications of video frame loss or non-reception, wherein determining the size of the sliding frame window comprises:

receiving an indication that a previously transmitted video frame has been determined to be lost or is associated with lost data packets; and determining a corresponding count representing a number of video frames transmitted after transmission of the previously transmitted video frame and before reception of at least one message comprising the indication;

wherein the size of the sliding frame window is determined using at least the corresponding count; and encode a plurality of video frames of the video stream according to the size of the sliding frame window, wherein a separation between a reference frame and a corresponding inter frame is greater than or equal to the size of the sliding frame window.

2. The processor of claim 1, wherein the size of the sliding frame window is a minimum number of consecutive video frames separating the reference frame and the corresponding inter frame, wherein the minimum number of consecutive video frames is greater than one.

3. The processor of claim 1, wherein the one or more circuits are to determine separations between reference frames and corresponding inter frames to be smaller than or equal to a size of a decoded picture buffer (DPB) of a decoder receiving the video stream.

4. The processor of claim 1, wherein the one or more circuits are to determine the size of the sliding frame window as at least one of:

an exponential average of counts of video frames corresponding to a plurality of messages;

an average of the counts of the video frames corresponding to the plurality of messages; or a weighted average of the counts of the video frames corresponding to the plurality of messages.

5. The processor of claim 1, wherein the one or more circuits are to determine the size of the sliding frame window to be equal to an estimate of a sum of (i) a round trip delay between the one or more circuits and a decoder receiving the video stream and (ii) a waiting time of the decoder representing a time duration during which the decoder waits before determining a video frame to be lost or to be associated with lost data packets.

6. The processor of claim 1, wherein in encoding the plurality of video frames of the video stream according to the size of the sliding frame window, the one or more circuits are to encode the video stream as multiple interleaved sub-streams, each sub-stream representing a separate referencing chain of video frames.

7. The processor of claim 6, wherein the multiple interleaved sub-streams are independent of one another.

8. The processor of claim 1, wherein the plurality of video frames is a first plurality of video frames, and the one or more circuits are to:

update the size of the sliding frame window; and encode a second plurality of video frames of the video stream according to the updated size of the sliding frame window.

9. The processor of claim 1, wherein the one or more circuits are to:

receive a message indicative of a first video frame that was previously transmitted and that is determined to be lost or to be associated with lost data packets;

identify a set of video frames encoded as directly or indirectly dependent upon the first video frame; and invalidate the set of video frames encoded as directly or indirectly dependent upon the first video frame.

10. The processor of claim 1, wherein the one or more circuits are to:

receive a message indicative of a first video frame that was previously transmitted and that is determined to be lost or to be associated with lost data packets;

identify a set of video frames, if any, encoded as directly or indirectly dependent upon the first video frame;

identify a second video frame to be encoded as dependent upon the first video frame or upon another video frame of the set of video frames;

drop the second video frame;

encode the second video frame as an intra frame; or encode the second video frame as dependent upon another video frame different from the first video frame and different from the set of video frames.

11. The processor of claim 1, further comprising: an application programming interface (API) that interfaces with an application executed using the one or more circuits, the API to cause the one or more circuits to determine the size of a sliding frame window and encode the plurality of video frames of the video stream according to the size of the sliding frame window.

12. A method comprising:

determining, using one or more processors, a size of a sliding frame window for a video stream, the size of the sliding frame window representing a minimum separation between reference frames and corresponding inter frames, wherein the size of the sliding frame window is determined based at least on message timing data associated with one or more indications of video frame loss or non-reception, wherein determining the size of the sliding frame window comprises:

receiving an indication that a previously transmitted video frame has been determined to be lost or is associated with lost data packets; and determining a corresponding count representing a number of video frames transmitted after transmission of the previously transmitted video frame and before reception of at least one message comprising the indication;

wherein the size of the sliding frame window is determined using at least the corresponding count; and encoding, using the one or more processors, a plurality of video frames of the video stream according to the size of the sliding frame window, such that a separation between a reference frame and a corresponding inter frame is greater than or equal to the size of the sliding frame window.

13. The method of claim 12, comprising at least one of:

determining the sliding frame window as a minimum number of consecutive video frames separating the reference frame and the corresponding inter frame, wherein the minimum number of consecutive video frames is greater than one; or determining separation between reference frames and corresponding inter frames to be smaller than or equal to a size of a decoded picture buffer (DPB) of a decoder receiving the video stream.

14. The method of claim 12, wherein the size of the sliding frame window is determined as at least one of:

an exponential average of counts of video frames corresponding to a plurality of messages;

an average of the counts of the video frames corresponding to the plurality of messages;

a weighted average of the counts of the video frames corresponding to the plurality of messages; or an estimate of a sum of (i) a round trip delay between the one or more processors and a decoder receiving the video stream and (ii) a waiting time of the decoder representing a time duration during which the decoder waits before determining a video frame to be lost or to be associated with lost data packets.

15. The method of claim 12, wherein encoding the plurality of video frames of the video stream according to the size of the sliding frame window includes encoding the video stream as multiple independent interleaved sub-streams, each sub-stream representing a separate referencing chain of video frames.

16. The method of claim 12, comprising:

receiving a message indicative of a first video frame that was previously transmitted and that is determined to be lost or to be associated with lost data packets;

identifying a set of video frames, if any, encoded as directly or indirectly dependent upon the first video frame;

invalidating the set of video frames encoded as directly or indirectly dependent upon the first video frame;

identifying a second video frame to be encoded as dependent upon the first video frame or upon another video frame of the set of video frames; and dropping the second video frame, encoding the second video frame as an intra frame, or encoding the second video frame as dependent upon another video frame different from the first video frame and different from the set of video frames.

17. A system, comprising:

an application programming interface (API) to interface with an application executed using one or more processors, the API to cause the one or more processors to:

determine a size of a sliding frame window for a video stream, wherein the size of the sliding frame window represents a minimum separation between reference frames and corresponding inter frames, wherein the size of the sliding frame window is determined based at least on message timing data associated with one or more indications of video frame loss or non-reception, wherein determining the size of the sliding frame window comprises:

receiving an indication that a previously transmitted video frame has been determined to be lost or is associated with lost data packets; and determining a corresponding count representing a number of video frames transmitted after transmission of the previously transmitted video frame and before reception of at least one message comprising the indication;

wherein the size of the sliding frame window is determined using at least the corresponding count; and encode a plurality of video frames of the video stream according to the size of the sliding frame window, wherein a separation between a reference frame and a corresponding inter frame, is greater than or equal to the size of the sliding frame window.

* * * * *